US012387694B2

(12) United States Patent
Lan et al.

(10) Patent No.: US 12,387,694 B2
(45) Date of Patent: Aug. 12, 2025

(54) SOURCE DRIVER AND DISPLAY DEVICE

(71) Applicants: Huizhou China Star Optoelectronics Display Co., Ltd., Guangdong (CN); TCL China Star Optoelectronics Technology Co., Ltd., Guangdong (CN)

(72) Inventors: Qingsheng Lan, Guangdong (CN); Weifeng Chen, Guangdong (CN)

(73) Assignees: Huizhos China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/289,030

(22) PCT Filed: Oct. 7, 2023

(86) PCT No.: PCT/CN2023/123144

§ 371 (c)(1),
(2) Date: Oct. 31, 2023

(87) PCT Pub. No.: WO2024/119991

PCT Pub. Date: Jun. 13, 2024

(65) Prior Publication Data

US 2025/0095601 A1 Mar. 20, 2025

(30) Foreign Application Priority Data

Dec. 7, 2022 (CN) ......................... 202211561500.3

(51) Int. Cl.
*G09G 3/36* (2006.01)

(52) U.S. Cl.
CPC ....... *G09G 3/3688* (2013.01); *G09G 2310/08* (2013.01)

(58) Field of Classification Search
CPC ............................. G09G 3/20; G09G 2370/08
See application file for complete search history.

(56) References Cited

U.S. PATENT DOCUMENTS 9,589,524 B2 3/2017 Park
10,614,749 B2 4/2020 Kim et al.
(Continued)

FOREIGN PATENT DOCUMENTS

CN 101527567 9/2009
CN 104751811 7/2015
(Continued)

OTHER PUBLICATIONS

International Search Report and the Written Opinion Dated Nov. 16, 2023 From the International Searching Authority Re. Application No. PCT/CN2023/123144 and Its Translation Into English. (16 Pages).

*Primary Examiner* — Nan-Ying Yang

(57) ABSTRACT

According to the data driver and the display device provided in the present application, the control module obtains the frequency value of image data according to the image data and outputs the control signal from the plurality of first output terminals according to the frequency value so that the recovery module recovers the clock signal corresponding to the image data under control of the control signal. By outputting the clock signal having corresponding data rate through the frequency value of the image data, an adaptive data rate function can be realized, and a wider data rate range can be realized.

16 Claims, 5 Drawing Sheets

(56) References Cited

U.S. PATENT DOCUMENTS

| | | | | |
|---|---|---|---|---|
| 11,024,249 | B2 | 6/2021 | Kim et al. | |
| 11,223,468 | B1 | 1/2022 | Ryu et al. | |
| 2020/0312260 | A1 * | 10/2020 | Kim | G09G 3/3696 |
| 2021/0065634 | A1 * | 3/2021 | Pyun | G09G 3/3291 |

FOREIGN PATENT DOCUMENTS

| | | |
|---|---|---|
| CN | 108694902 | 10/2018 |
| CN | 111754949 | 10/2020 |
| CN | 114079600 | 2/2022 |
| CN | 115831072 | 3/2023 |

* cited by examiner

SOURCE DRIVER AND DISPLAY DEVICE

RELATED APPLICATIONS

This application is a National Phase of PCT Patent Application No. PCT/CN2023/123144 having International filing date of Oct. 7, 2023, which claims the benefit of priority of China Patent Application No. 202211561500.3 filed on Dec. 7, 2022. The contents of the above applications are all incorporated by reference as if fully set forth herein in their entirety.

TECHNICAL FIELD

The present application relates to the field of display technologies, and more particularly to a source driver and a display device.

BACKGROUND

A display device such as a liquid crystal display device or an organic light emitting display device transmits various types of data required for generating one or more data signals through an in-panel interface established between a timing controller and a source driver.

Currently, the data rate of the in-panel interface is generally in the range of 0.6 Gbps-1.8 Gbps (for example, 1.2 Gbps) or 1.2 Gbps-3 Gbps (for example, 1.8 Gbps). When a source driver with a higher data rate is selected, the source driver cannot be compatible with an application range with a low data rate, and therefore a product application range thereof is limited. At the same time, in some cases, a new source driver may need to be developed, resulting in unnecessary resource waste and increased costs.

SUMMARY

The present application provides a source driver and a display device, which can realize an adaptive data rate function and realize a wider data rate range.

In a first aspect, the present application provides a source driver, including: a control module including a first input terminal and a plurality of first output terminals and configured to obtain a frequency value of image data received from the first input terminal according to the image data and output a control signal from the plurality of first output terminals according to the frequency value; and a recovery module including a second input terminal, a plurality of first control terminals and a second output terminal, where the second input terminal is electrically connected to the first input terminal, the plurality of first control terminals are electrically connected to the plurality of first output terminals in one-to-one correspondence, and the recovery module is configured to recover a clock signal corresponding to the image data under control of the control signal.

In the source driver provided in the present application, the control module includes: a counting unit configured to calculate a time period of a high level in the image data and a time period of a low level in the image data; and a calculation unit configured to calculate the frequency value of the image data based on the time period of the high level and the time period of the low level, and output the control signal from the plurality of first output terminals according to the frequency value.

In the source driver provided in the present application, the control module further includes a division frequency unit configured to perform division frequency on the image data; and a voltage conversion unit configured to perform voltage conversion on the image data after the division frequency and output the converted image data to the counting unit.

In the source driver provided in the present application, the voltage conversion unit includes a first transistor and a second transistor, wherein a gate of the first transistor and a gate of the second transistor are both electrically connected to an output terminal of the division frequency unit, a drain of the first transistor and a drain of the second transistor are both electrically connected to an input terminal of the counting unit, a source of the first transistor is electrically connected to a high level signal terminal, and a source of the second transistor is electrically connected to a low level signal terminal.

In the source driver provided in the present application, the first transistor is one of an N-type transistor and a P-type transistor, and the second transistor is another one of the N-type transistor and the P-type transistor.

In the source driver provided in the present application, the recovery module includes: a phase detector configured to detect a phase difference between the image data and the clock signal; a charge pump configured to generate a voltage control signal by converting the detected phase difference into a voltage signal; a plurality of voltage control oscillators configured to output the clock signal in response to the voltage control signal; and a switching unit including a third input terminal, a plurality of second control terminals, and a plurality of third output terminals, wherein the third input terminal is connected to the voltage control signal, the plurality of second control terminals are electrically connected to the plurality of first output terminals in one-to-one correspondence, and the plurality of third output terminals are electrically connected to the plurality of voltage control oscillators in one-to-one correspondence.

In the source driver provided in the present application, the switching unit includes a plurality of third transistors, where a source of each of the third transistors is electrically connected to the third input terminal, a drain of the third transistor is electrically connected to corresponding one of the third output terminals, and a gate of the third transistor is electrically connected to corresponding one of the second control terminals.

In the source driver provided in the present application, the plurality of voltage control oscillators have different output frequency widths.

In the source driver provided in the present application, the source driver further includes an equalization module configured to receive the image data and electrically connected to the first input terminal and the second input terminal, where the equalization module is configured to compensate for the image data and output the image data to the first input terminal and the second input terminal.

In a second aspect, the present application further provides a display device, including a timing controller, a source driver, and a display panel, where the timing controller is configured to generate image data, the source driver is configured to generate a data voltage according to the image data and includes any one of the source drivers described above, and the display panel includes a sub-pixel configured to receive the data voltage through a data line and emit light having brightness corresponding to the data voltage.

Beneficial Effects

According to the data driver and the display device provided in the present application, the control module obtains the frequency value of image data received from the first input terminal according to the image data and outputs the control signal from the plurality of first output terminals according to the frequency value so that the recovery module recovers the clock signal corresponding to the image data under control of the control signal. That is, the present application can output the clock signal having corresponding data rate through the frequency value of the image data, so that an adaptive data rate function can be realized, and a wider data rate range can be realized.

DETAILED DESCRIPTION

To make the objectives, technical solutions, and effects of the present application more clear and definite, the present application is illustrated in detail below by referring to the accompanying drawings and illustrating the embodiments. It should be understood that the specific embodiments described here are only used to explain the present application, and are not used to limit the present application.

Figure 1:
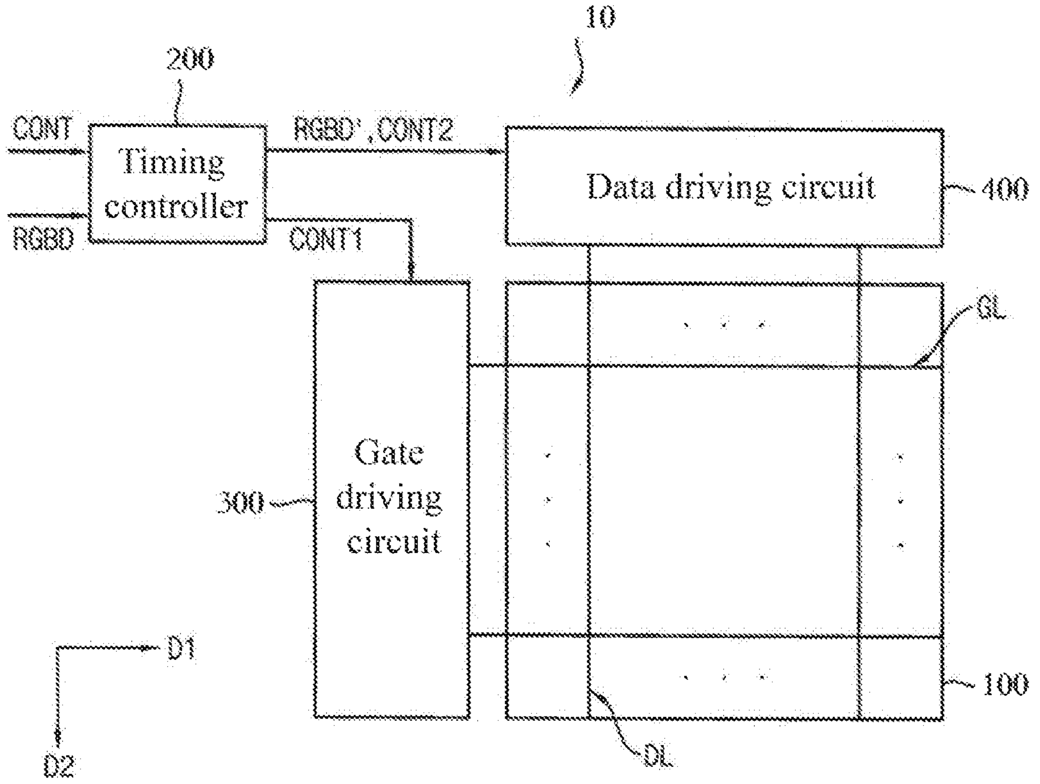
FIG. 1 is a diagram of an exemplary embodiment of a display device according to some embodiments of the present application.

Please refer to FIG. 1, which is a diagram of an exemplary embodiment of a display device according to some embodiments of the present application. In FIG. 1, as one of embodiments to which the present application is applied, a liquid crystal display device including a gate driving circuit and a data driving circuit is shown. However, the present application is not limited thereto. The present application is not limited to the liquid crystal display devices, and can be applied to other types of display devices such as organic light emitting display devices.

As shown in FIG. 1, a display device 10 according to some embodiments of the present application includes a display panel 100, a timing controller 200, a gate driving circuit 300, and a data driving circuit 400.

The display panel 100 includes a plurality of gate lines GL connected to the gate driving circuit 300 and a plurality of data lines DL connected to the data driving circuit 400. The display panel 100 may display an image having a plurality of gray levels based on output image data RGBD'. The gate lines GL may extend substantially in the first direction D1, and the data lines DL may extend substantially in the second direction D2 intersecting the first direction D1. For example, the first direction is substantially perpendicular to the second direction.

The display panel 100 may include a plurality of sub-pixels arranged substantially in an array. Each of the sub-pixels may be electrically connected to respective one of the gate lines GL and respective one of the data lines DL. A plurality of sub-pixels in each row of sub-pixels may be red sub-pixels, green sub-pixels, or blue sub-pixels, and each column of sub-pixels may include a red sub-pixel, a green sub-pixel, and a blue sub-pixel.

Each of the sub-pixels may include a switching element (not shown), a liquid crystal capacitor (not shown), and a storage capacitor (not shown). The liquid crystal capacitor and the storage capacitor may be electrically connected to the switching element. In an exemplary embodiment, for example, the switching element may be a thin film transistor. The liquid crystal capacitor may include a first electrode connected to a pixel electrode and a second electrode connected to a common electrode. A data voltage may be applied to the first electrode of the liquid crystal capacitor. A common voltage may be applied to the second electrode of the liquid crystal capacitor. The storage capacitor may include a first electrode connected to the pixel electrode and a second electrode connected to the storage electrode. The data voltage may be applied to the first electrode of the storage capacitor. A storage voltage may be applied to the second electrode of the storage capacitor. The storage voltage may be substantially equal to the common voltage.

The timing controller 200 controls an operation of the display panel 100, and controls operations of the gate driving circuit 300 and the data driving circuit 400. The timing controller 200 receives input image data RGBD and input control signal CONT from an external device (e.g., a host). The input image data RGBD may include a plurality of pieces of input sub-pixel data for the plurality of sub-pixels. Each of the plurality of pieces of input sub-pixel data may include red gray level data R, green gray level data G, and blue gray level data B of corresponding one of the plurality of sub-pixels. The input control signal CONT may include a master clock signal, a data enable signal, a vertical synchronization signal, a horizontal synchronization signal, or the like.

The timing controller 200 generates the output image data RGBD', a first output control signal CONT1, and a second output control signal CONT2 based on the input image data RGBD and the input control signal CONT.

In an exemplary embodiment, for example, the timing controller 200 may generate the output image data RGBD' based on the input image data RGBD. The output image data RGBD' may be provided to the data driving circuit 400. In some exemplary embodiments, the output image data RGBD' may be substantially the same image data as the input image data RGBD. In other exemplary embodiments, the output image data RGBD' may be compensation image data generated by compensating for the input image data RGBD.

The timing controller 200 can generate the first output control signal CONT1 based on the input control signal CONT. The first output control signal CONT1 may be provided to the gate driving circuit 300, and a driving timing of the gate driving circuit 300 may be controlled based on the first output control signal CONT1. The first output control signal CONT1 may include a vertical start signal, a gate clock signal, and the like. The timing controller 200 may generate the second output control signal CONT2 based on the input control signal CONT. The second output control signal CONT2 may be provided to the data driving circuit 400, and a driving timing of the data driving circuit 400 may be controlled based on the second output control signal CONT2. The second output control signal CONT2 may include a horizontal start signal, a data clock signal, a data load signal, a polarity control signal, and the like.

The gate driving circuit 300 receives the first output control signal CONT1 from the timing controller 200. The gate driving circuit 300 generates a plurality of gate signals for driving the gate lines GL based on the first output control signal CONT1. The gate driving circuit 300 may continuously apply the plurality of gate signals to the gate lines GL. The gate drive circuit 300 is electrically connected to the plurality of gate lines GL. That is, the gate driving circuit has a plurality of gate signal output terminals electrically connected to the plurality of gate lines GL in one-to-one correspondence.

In some exemplary embodiments, the gate driving circuit 300 may, for example, be arranged to be mounted directly on the display panel 100, or may be connected to the display panel 100 in a Tape Carrier Package ("TCP") manner. Alternatively, the gate driving circuit 300 may be an integrated circuit disposed on the display panel 100.

The data driving circuit 400 receives the second output control signal CONT2 and the output image data RGBD' from the timing controller 200. The data driving circuit 400 generates a plurality of data voltages (e.g., analog data voltages) based on the second output control signal CONT2 and the output image data RGBD' (e.g., digital image data). The data driving circuit 400 may apply the plurality of data voltages to the data lines DL. The data driving circuit 400 is electrically connected to the plurality of data lines DL. That is, the data driving circuit has a plurality of data voltage output terminals a electrically connected to the plurality of data lines DL in one-to-one correspondence.

In some exemplary embodiments, the data driving circuit 400 may, for example, be arranged to be mounted directly on the display panel 100, or may be connected to the display panel 100 in a Tape Carrier Package ("TCP") manner. Alternatively, the data driving circuit 400 may be an integrated circuit disposed on the display panel 100.

Figure 2:
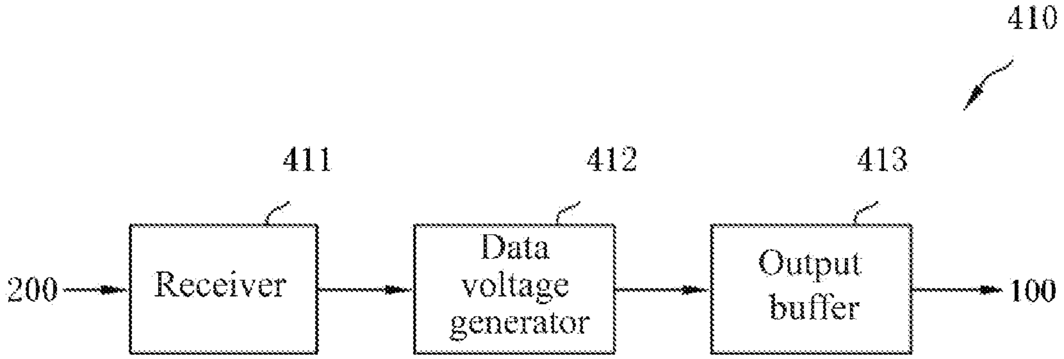
FIG. 2 is a block diagram of an exemplary embodiment of a source driver according to some embodiments of the present application.

Please refer to FIG. 2, which is a block diagram of an exemplary embodiment of a source driver according to some embodiments of the present application. In some exemplary embodiments, the data driving circuit 400 may include a plurality of source drivers 410, where each of the source drivers 410 is configured to generate a data voltage based on the image data output by the timing controller 200 (i.e., the output image data RGBD' shown in FIG. 1). Each of the source drivers 410 may include a receiver 411, a data voltage generator 412, and an output buffer 413.

The receiver 411 may receive image data (i.e., the output image data RGBD' shown in FIG. 1) from the timing controller 200, and transmit the image data to the data voltage generator 412. The image data may be configured in the form of a packet including a clock training pattern or the like. For example, the receiver 411 may be rearranged corresponding to the data lines and in parallel output the image data serially transmitted from the timing controller 200 via one signal transmission line.

In some exemplary embodiments, the receiver 411 may compensate for distortion of the image data caused by the signal transmission line. The receiver 411 may recover (or generate) a clock signal corresponding to a transmission rate of the image data, and adaptively change the ability to compensate for distortion of the image data based on a recovery rate of the clock signal.

The data voltage generator 412 may generate a data voltage based on the image data. In some exemplary embodiments, the data voltage generator 412 may include, for example, a shift register, a data latch, and a digital-to-analog converter. The shift register may sequentially provide the image data to the data latch. The data latch may latch data received sequentially from the shift register and provide the data to the digital-to-analog converter simultaneously. The digital-to-analog converter may convert the digital data to a data voltage based on a gamma voltage.

The output buffer 413 may select a polarity of the data signal and output the data signal having the selected polarity to the data line. In some exemplary embodiments, for example, the output buffer 413 may select one of a positive data voltage and a negative data voltage corresponding to the data signal, and output the selected data voltage to the data line.

Figure 3:
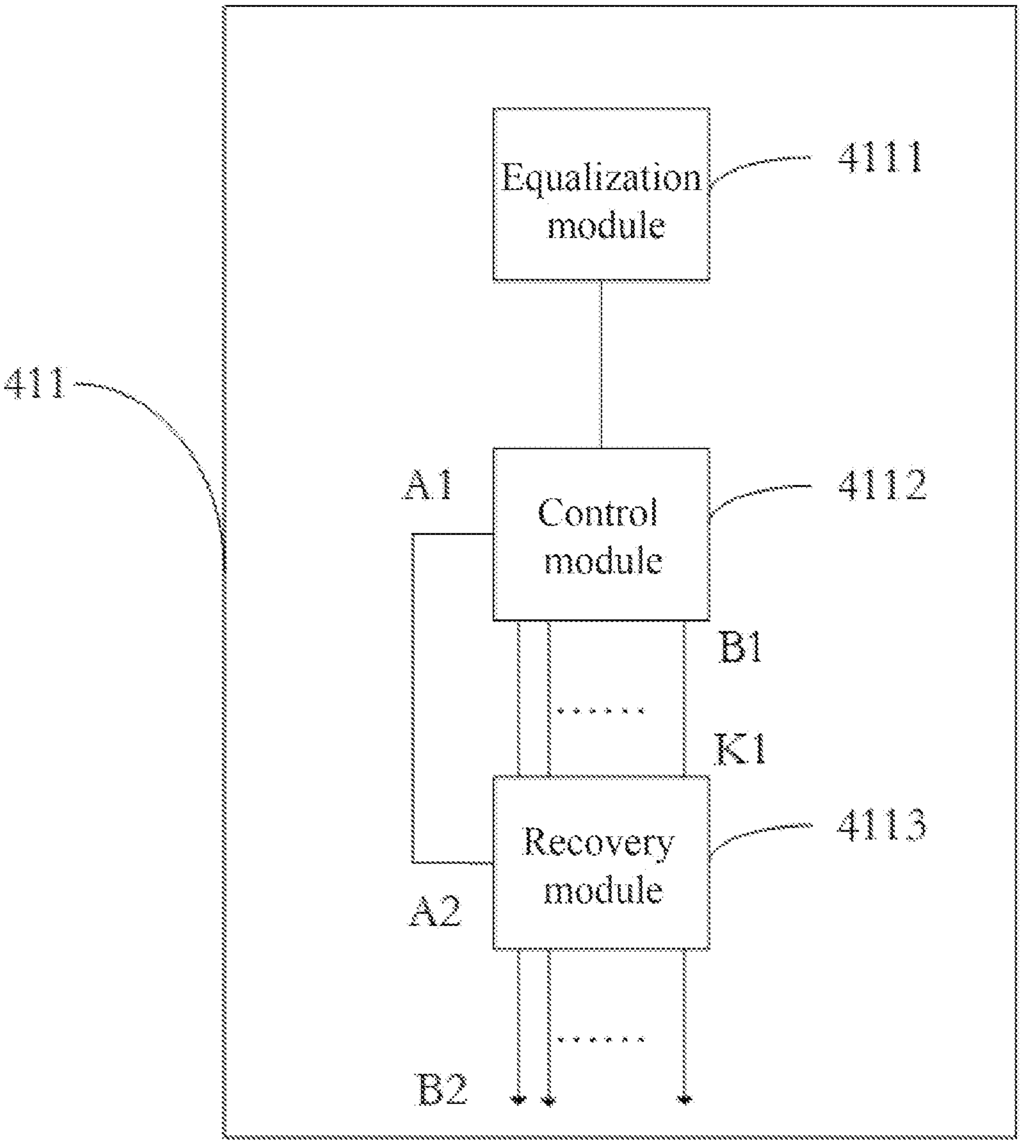
FIG. 3 is a block diagram of an exemplary embodiment of a receiver included in the source driver shown in FIG. 2.

Please refer to FIG. 3, which is a block diagram of an exemplary embodiment of a receiver included in the source driver shown in FIG. 2. The receiver 411 may include an equalization module 4111, a control module 4112, and a recovery module 4113.

The equalization module 4111 may compensate for the image data. That is, the equalization module 4111 may compensate for distortion of a signal (e.g., distortion of a high frequency component) during transmission of the signal between the source driver 410 and the timing controller 200 by flattening a frequency response of the image data. The equalization module 4111 may be implemented with a conventional equalizer, and thus, a description of a detailed configuration of the equalizer will be omitted.

The control module 4112 has a first input terminal A1 and a plurality of first output terminals B1. The control module 4112 is configured to obtain a frequency value of image data received from the first input terminal A1 based on the image data and output a control signal from the plurality of first output terminals B1 based on the frequency value.

Figure 4:
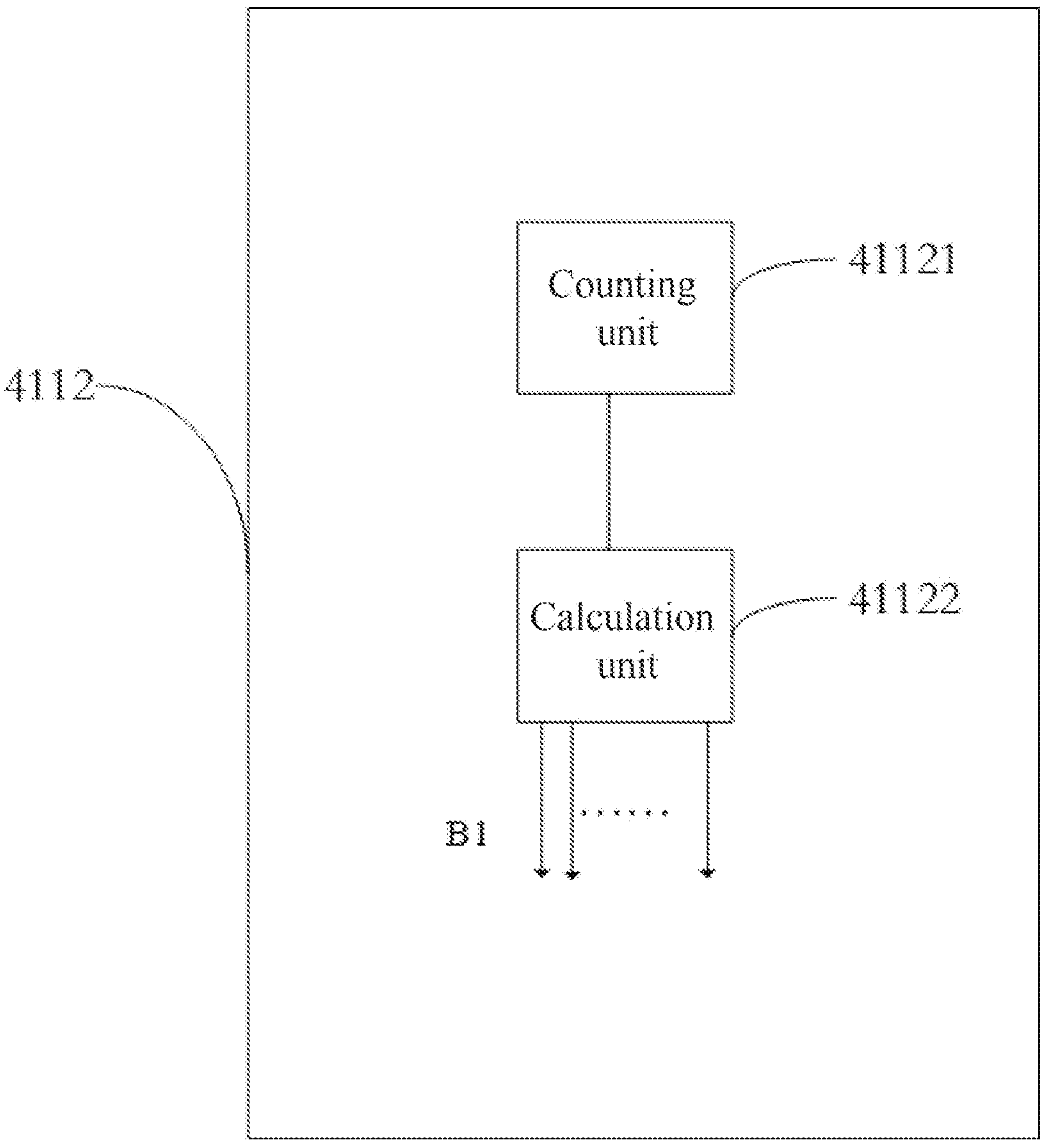
FIG. 4 is a block diagram of an exemplary embodiment of a control module included in the receiver shown in FIG. 3.

In some exemplary embodiments, please refer to FIG. 4, which is a block diagram of an exemplary embodiment of a control module included in the receiver shown in FIG. 3. The control module 4112 includes a counting unit 41121 and a calculation unit 41122. The counting unit 41121 is configured to calculate a time period of a high level in the image data and a time period of a low level in the image data. The calculation unit 41122 is configured to calculate the frequency value of the image data based on the time period of the high level and the time period of the low level, and output the control signal from the plurality of first output terminals B1 based on the frequency value.

Figure 5:
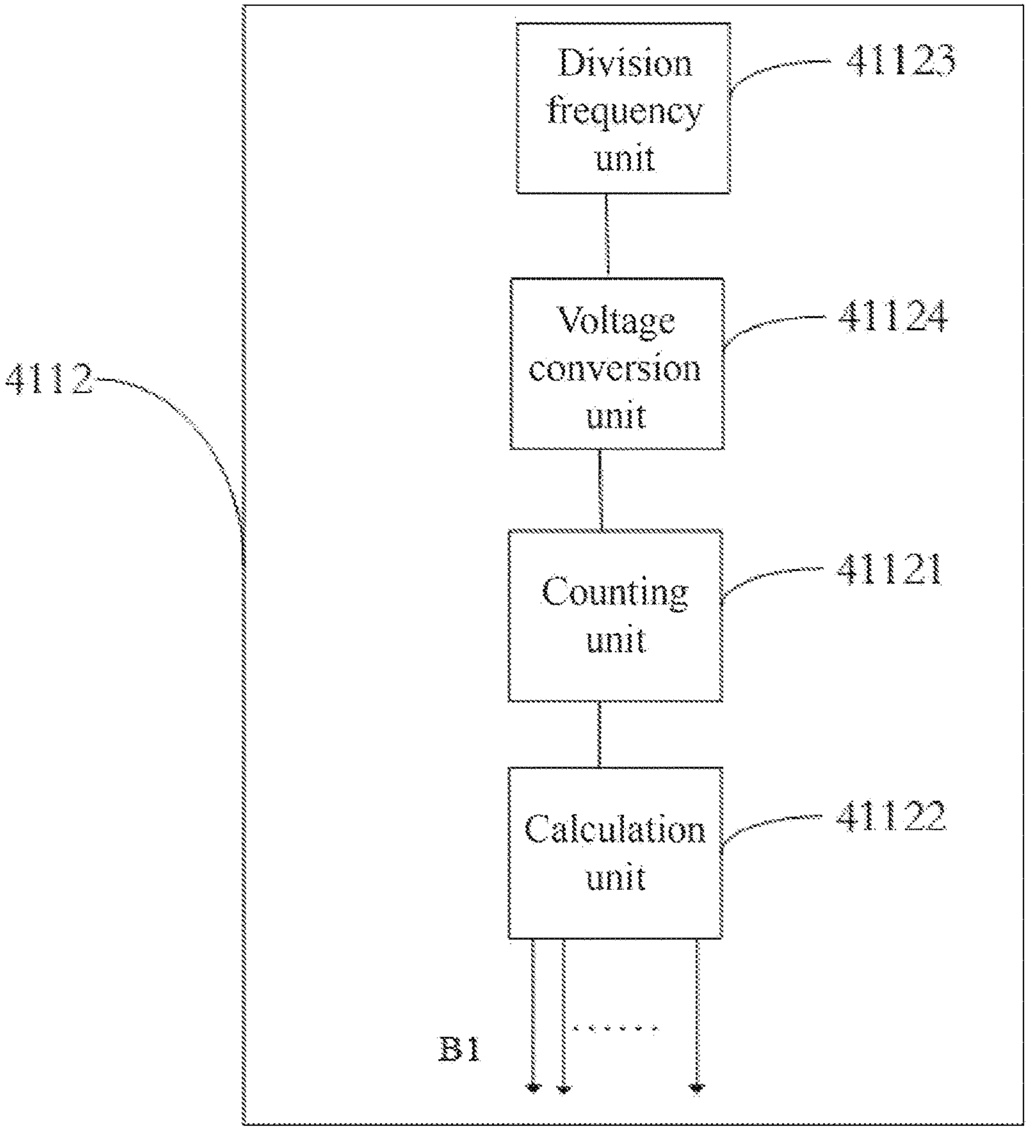
FIG. 5 is another block diagram of an exemplary embodiment of a control module included in the receiver shown in FIG. 3.

In other exemplary embodiments, please refer to FIG. 5, which is another block diagram of an exemplary embodiment of a control module included in the receiver shown in FIG. 3. The control module 4112 shown in FIG. 5 differs from the control module 4112 shown in FIG. 4 in that the control module 4112 shown in FIG. 5 further includes a division frequency unit 41123 and a voltage conversion unit 41124.

The division frequency unit 41123 is configured to perform division frequency on the image data. The voltage conversion unit 41124 is configured to perform voltage conversion on the image data after the division frequency and output the converted image data to the counting unit 41121.

Figure 6:
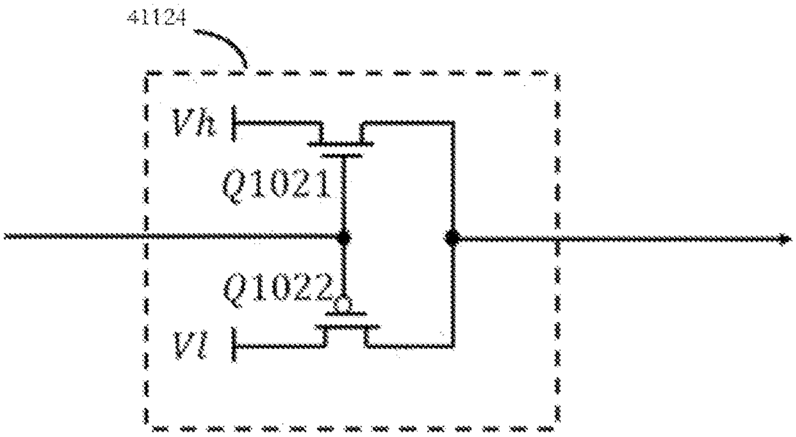
FIG. 6 is a block diagram of an exemplary embodiment of a voltage conversion unit included in the control module shown in FIG. 5.

Please refer to FIG. 6, which is a block diagram of an exemplary embodiment of a voltage conversion unit included in the control module shown in FIG. 5. The voltage conversion unit 41124 includes a first transistor Q1021 and a second transistor Q1022. A gate of the first transistor Q1021 and a gate of the second transistor Q1022 are both electrically connected to an output terminal of the division frequency unit 41123, a drain of the first transistor Q1021 and a drain of the second transistor Q1022 are both electrically connected to an input terminal of the counting unit 41121, a source of the first transistor Q1021 is electrically connected to a high level signal terminal Vh, and a source of the second transistor Q1022 is electrically connected to a low level signal terminal V1. The first transistor Q1021 is one of an N-type transistor and a P-type transistor, and the second transistor Q1022 is another one of the N-type transistor and the P-type transistor.

The recovery module 4113 can recover the clock signal and the image data by the compensated image data. In some exemplary embodiments, the recovery module 4113 may generate a clock signal (e.g., a clock signal having a frequency of 1 GHz) corresponding to the transmission rate of the image data (e.g., 2 Gbps), and recover the image data based on the clock signal.

Figure 7:
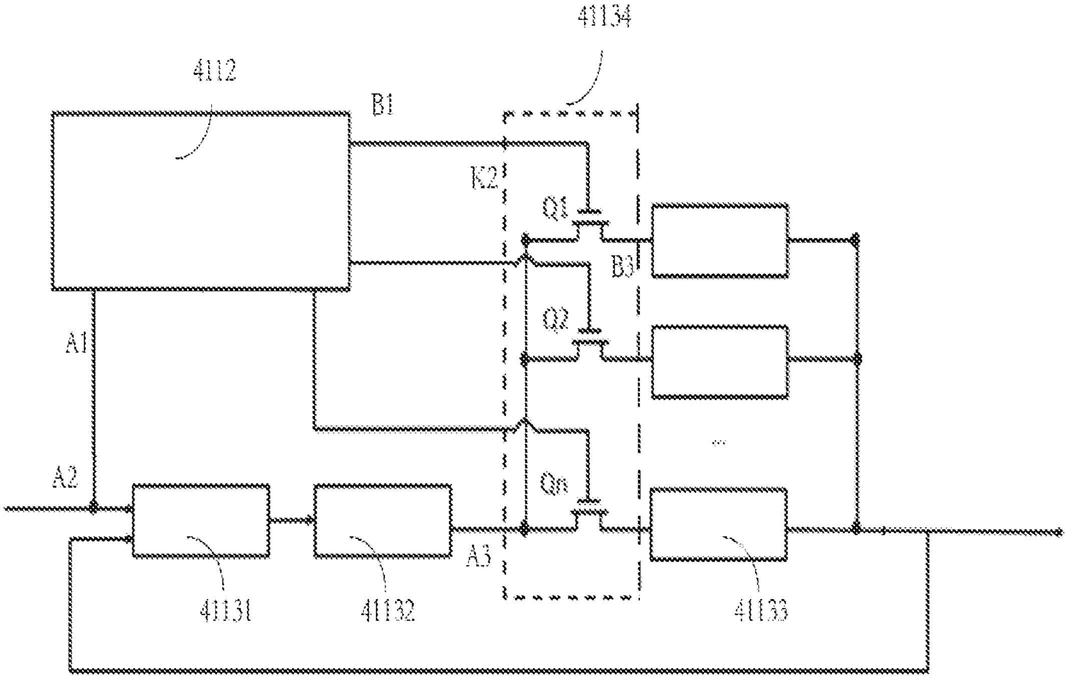
FIG. 7 is a block diagram of an exemplary embodiment of a recovery module included in the receiver shown in FIG. 3.

Please refer to FIG. 7, which is a block diagram of an exemplary embodiment of a recovery module included in the receiver shown in FIG. 3. The recovery module 4113 may include a phase detector 41131, a charge pump 41132, a loop filter, a plurality of voltage control oscillators 41133, and a switching unit 41134. The phase detector 4113 is configured to detect a phase difference between the image data and the clock signal. The charge pump 41132 is configured to generate a voltage control signal by converting the detected phase difference into a voltage signal. The plurality of voltage control oscillators 41133 are configured to output a clock signal in response to the voltage control signal. The switching unit 41134 includes a third input terminal A3, a plurality of second control terminals K2, and a plurality of third output terminals B3, where the third input terminal A3 is connected to the voltage control signal, the plurality of second control terminals K2 are electrically connected to the plurality of first output terminals B1 in one-to-one correspondence, and the plurality of third output terminals B3 are electrically connected to the plurality of voltage control oscillators 41133 in one-to-one correspondence.

The phase detector 41131 may detect a phase difference by comparing the compensated image data (e.g., a clock training pattern included in the compensated image data) with a feedback clock signal (i.e., a clock signal generated in the voltage control oscillator). In some exemplary embodiments, the phase detector 41131 may output a pulse signal corresponding to the phase difference. The charge pump 41132 and the loop filter may generate a voltage control signal by converting the phase difference detected by the phase detector 41131 into a voltage signal. In some exemplary embodiments, the charge pump 41132 may convert the pulse signal to a voltage, or output a voltage in proportional to the pulse signal. The loop filter may output a voltage control signal by filtering a frequency generated during loop operation of the recovery module. In other exemplary embodiments, the charge pump 41132 may output a current in proportion to the pulse signal, and the loop filter may change the voltage control signal based on change in the amount of charge accumulated by the capacitor according to the current. That is, the charge pump 41132 and the loop filter may constitute a voltage control circuit for controlling the voltage control oscillator 41133. The voltage control oscillator 41133 may output a clock signal having a specific frequency in response to the voltage control signal. Output widths of the plurality of voltage control oscillators 41133 are different from each other.

Specifically, the switching unit 41134 includes a plurality of third transistors Q1, Q2, . . . , Qn, where a source of each of the third transistors Q1, Q2, . . . , Qn is electrically connected to the third input terminal A3, and a drain of each of the third transistors Q1, Q2, . . . , Qn is electrically connected to corresponding one of the third output terminals B3, and a gate of each of the third transistors Q1, Q2, . . . , Qn is electrically connected to corresponding one of the second control terminals K2.

According to the data driver provided in the present application, the control module obtains the frequency value of image data received from the first input terminal according to the image data and outputs the control signal from the plurality of first output terminals according to the frequency value so that the recovery module recovers the clock signal corresponding to the image data under control of the control signal. That is, the present application can output the clock signal having corresponding data rate through the frequency value of the image data, so that an adaptive data rate function can be realized, and a wider data rate range can be realized.

It can be understood that, for those ordinary skilled in the art, equivalent replacements or changes can be made according to the technical solutions and inventive concepts of the present disclosure, and all such changes or replacements should fall within the protection scope of the claims appended to the present disclosure.

What is claimed is:

1. A source driver, comprising:

a control module including a first input terminal and a plurality of first output terminals and configured to obtain a frequency value of image data received from the first input terminal based on the image data and output a control signal from the plurality of first output terminals based on the frequency value; and a recovery module including a second input terminal, a plurality of first control terminals and a second output terminal, wherein the second input terminal is electrically connected to the first input terminal, the plurality of first control terminals are electrically connected to the plurality of first output terminals in one-to-one correspondence, and the recovery module is configured to recover a clock signal corresponding to the image data under control of the control signal;

wherein the control module comprises:

a counting unit configured to calculate a time period of a high level in the image data and a time period of a low level in the image data;

a calculation unit configured to calculate the frequency value of the image data based on the time period of the high level and the time period of the low level, and output the control signal from the plurality of first output terminals based on the frequency value;

a division frequency unit configured to perform division frequency on the image data; and a voltage conversion unit configured to perform voltage conversion on the image data after the division frequency and output the converted image data to the counting unit;

wherein the voltage conversion unit comprises: a first transistor and a second transistor, wherein a gate of the first transistor and a gate of the second transistor are both electrically connected to an output terminal of the division frequency unit, a drain of the first transistor and a drain of the second transistor are both electrically connected to an input terminal of the counting unit, a source of the first transistor is electrically connected to a high level signal terminal, and a source of the second transistor is electrically connected to a low level signal terminal.

2. The source driver of claim 1, wherein the first transistor is one of an N-type transistor and a P-type transistor, and the second transistor is another one of the N-type transistor and the P-type transistor.

3. The source driver of claim 1, wherein the recovery module comprises:

a phase detector configured to detect a phase difference between the image data and the clock signal;

a charge pump configured to generate a voltage control signal by converting the detected phase difference into a voltage signal;

a plurality of voltage control oscillators configured to output the clock signal in response to the voltage control signal; and a switching unit including a third input terminal, a plurality of second control terminals, and a plurality of third output terminals, wherein the third input terminal is connected to the voltage control signal, the plurality of second control terminals are electrically connected to the plurality of first output terminals in one-to-one correspondence, and the plurality of third output terminals are electrically connected to the plurality of voltage control oscillators in one-to-one correspondence.

4. The source driver of claim 3, wherein the switching unit comprises:

a plurality of third transistors, wherein a source of each of the third transistors is electrically connected to the third input terminal, a drain of the third transistor is electrically connected to corresponding one of the third output terminals, and a gate of the third transistor is electrically connected to corresponding one of the second control terminals.

5. The source driver of claim 3, wherein the plurality of voltage control oscillators have different output frequency widths.

6. The source driver of claim 1, further comprising:

an equalization module configured to receive the image data and electrically connected to the first input terminal and the second input terminal, wherein the equalization module is configured to compensate for the image data and output the image data to the first input terminal and the second input terminal.

7. A display device, comprising:

a timing controller configured to generate image data;

the source driver of claim 1 configured to generate a data voltage based on the image data; and a display panel including at least one sub-pixel configured to receive the data voltage through a data line and emit light having brightness corresponding to the data voltage.

8. The display device of claim 7, wherein the first transistor is one of an N-type transistor and a P-type transistor, and the second transistor is another one of the N-type transistor and the P-type transistor.

9. The display device of claim 7, wherein the recovery module includes:

a phase detector configured to detect a phase difference between the image data and the clock signal;

a charge pump configured to generate a voltage control signal by converting the detected phase difference into a voltage signal;

a plurality of voltage control oscillators configured to output the clock signal in response to the voltage control signal; and a switching unit including a third input terminal, a plurality of second control terminals, and a plurality of third output terminals, wherein the third input terminal is connected to the voltage control signal, the plurality of second control terminals are electrically connected to the plurality of first output terminals in one-to-one correspondence, and the plurality of third output terminals are electrically connected to the plurality of voltage control oscillators in one-to-one correspondence.

10. The display panel of claim 9, wherein the switching unit comprises a plurality of third transistors, wherein a source of each of the third transistors is electrically connected to the third input terminal, a drain of the third transistor is electrically connected to corresponding one of the third output terminals, and a gate of the third transistor is electrically connected to corresponding one of the second control terminals.

11. The display device of claim 9, wherein the plurality of voltage control oscillators have different output frequency widths.

12. The display device of claim 7, wherein the source driver further comprises:

an equalization module configured to receive the image data and electrically connected to the first input terminal and the second input terminal, wherein the equalization module is configured to compensate for the image data and output the image data to the first input terminal and the second input terminal.

13. The display device of claim 9, wherein the recovery module further comprises a loop filter that filters a frequency generated by the recovery module during a loop operation.

14. The display device of claim 13, wherein both the loop filter and the charge pump constitute a voltage control circuit for generating the voltage control signal.

15. A source driver, comprising:

a control module including a first input terminal and a plurality of first output terminals and configured to obtain a frequency value of image data received from the first input terminal based on the image data and output a control signal from the plurality of first output terminals based on the frequency value; and a recovery module including a second input terminal, a plurality of first control terminals and a second output terminal, wherein the second input terminal is electrically connected to the first input terminal, the plurality of first control terminals are electrically connected to the plurality of first output terminals in one-to-one correspondence, and the recovery module is configured to recover a clock signal corresponding to the image data under control of the control signal;

wherein the recovery module comprises:

a phase detector configured to detect a phase difference between the image data and the clock signal;

a charge pump configured to generate a voltage control signal by converting the detected phase difference into a voltage signal;

a plurality of voltage control oscillators configured to output the clock signal in response to the voltage control signal; and a switching unit including a third input terminal, a plurality of second control terminals, and a plurality of third output terminals, wherein the third input terminal is connected to the voltage control signal, the plurality of second control terminals are electrically connected to the plurality of first output terminals in one-to-one correspondence, and the plurality of third output terminals are electrically connected to the plurality of voltage control oscillators in one-to-one correspondence.

16. A display device, comprising:

a timing controller configured to generate image data;

the source driver of claim 15 configured to generate a data voltage based on the image data; and a display panel including at least one sub-pixel configured to receive the data voltage through a data line and emit light having brightness corresponding to the data voltage.

* * * * *